June 5, 1945.  F. W. SIDE  2,377,526
BEARING
Filed July 16, 1943  2 Sheets-Sheet 1

INVENTOR.
FREDERICK W. SIDE
BY
C. B. Spangenberg
ATTORNEY.

June 5, 1945.　　　　F. W. SIDE　　　2,377,526
BEARING
Filed July 16, 1943　　　　2 Sheets-Sheet 2

INVENTOR.
FREDERICK W. SIDE
BY
C. B. Spangenberg
ATTORNEY.

Patented June 5, 1945

2,377,526

UNITED STATES PATENT OFFICE 2,377,526

BEARING

Frederick W. Side, Philadelphia, Pa., assignor to The Brown Instrument Company, Philadelphia, Pa., a corporation of Pennsylvania Application July 16, 1943, Serial No. 494,957

14 Claims. (Cl. 308—36.3)

The present invention relates to measuring instruments, and more particularly to pressure tight bearings of the type through which a shaft extends from a location in which one pressure is maintained to a location in which a different pressure is maintained.

In a number of measuring and control applications it is necessary to transmit the movement of an element within an enclosed space to a second element which is located on the exterior of the space. This is usually done by attaching the elements to the opposite ends of a shaft which is rotatable in a bearing that is capable of maintaining the pressure differential between the interior and exterior of the said space.

It is an object of the invention to provide a pressure tight bearing for a shaft, which bearing is capable of maintaining a large pressure differential across it. The said bearing is so constructed that the shaft therein is adequately supported and freely rotatable so that minute rotative forces applied to the shaft may be readily detected and transferred to the shaft.

It is a further object of the invention to provide a pressure tight bearing and a shaft to rotate in the bearing that may be easily and inexpensively manufactured, and one which is sensitive to the slightest force applied to the shaft. It is another object of the invention to provide a pressure tight bearing and a shaft therefor in which there will be no binding of the shaft and in which the internal resistance to the rotation of the shaft is held at a minimum.

In the following description the invention is described as being used with a flow meter, but it will be obvious that the bearing may be used at any place in which it is desired to transfer motion from a location at one pressure to a location at a different pressure.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Figure 1:
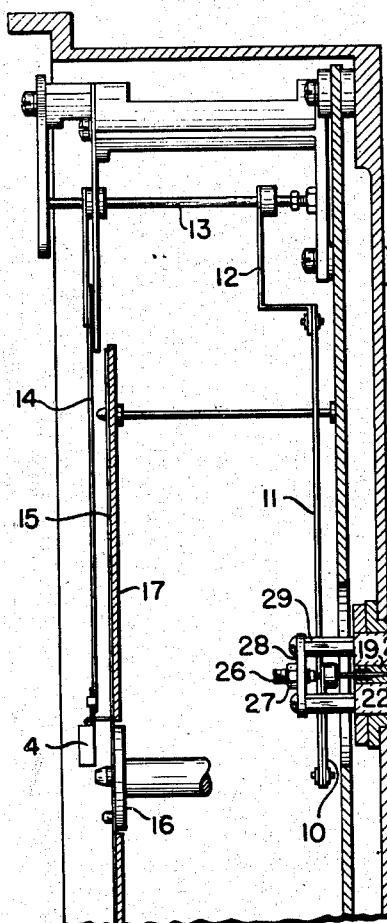
Figure 1 shows a view, partly in section, of a flow meter including the pressure tight bearing of the present invention.
Figure 1:
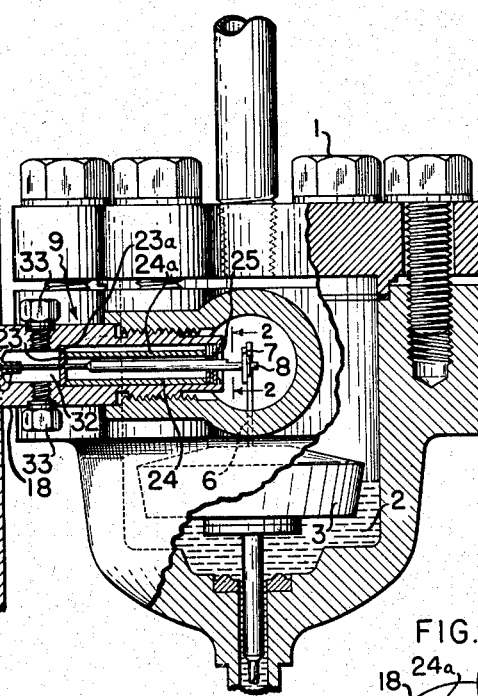

Referring first to Figure 1 there is shown a manometer 1 of conventional form. As is well known, a manometer includes a pair of pressure chambers to which a differential pressure is applied. As the applied pressure changes, the level of a measuring liquid 2, such as mercury, changes to raise or lower a float 3 that is resting on the surface of the liquid. The position of the float is transferred to a pen 4 which is located in an instrument casing 5 that is suitably attached to the manometer 1. The movement of the pen 4 by the float 3 is imparted through a mechanism which comprises a rod 6 that projects upwardly from the upper surface of the float 3, and which is pivoted at its upper end to an arm 7 that is attached to a shaft 8. This shaft extends through the pressure tight bearing 9 and has on its left end an arm 10 that is connected by means of a link 11 to a second arm 12. The arm 12 is fastened to a shaft 13 that is suitably pivoted in the instrument casing and which shaft has on its right end a pen arm 14 that supports the pen 4. As the level of the liquid 2 changes, the float, through the linkage just described, moves the pen 4 across a chart 15 to record thereon the position of the float which is proportional to the value of the condition being measured. The chart is mounted on a chart hub 16 that may be rotated at a suitable rate of speed by any conventional type of clock mechanism. The chart is backed up by a plate 17 that is also fastened in any suitable fashion in the casing 5.

Figure 2:
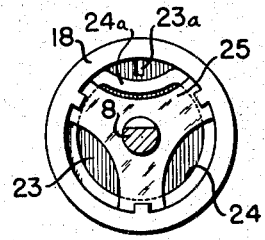
Figure 2 is a view taken on line 2—2 of Figure 1.
Figure 3:
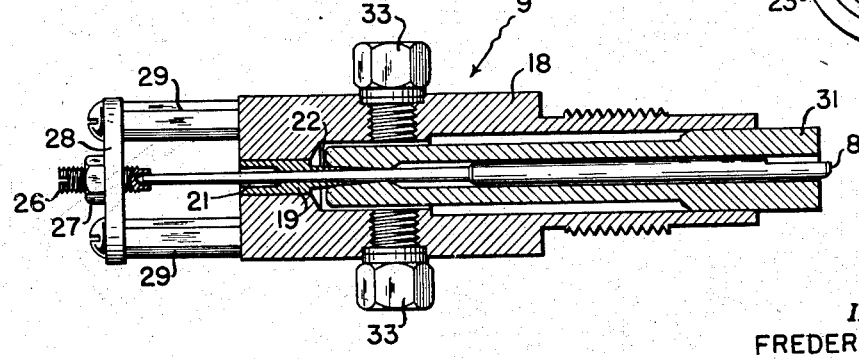
Figure 3 is a sectional view showing the method of assembling the bearing.

The invention relates more particularly to the shaft 8 and the bearing 9, the details of which are now to be described. The bearing 9 is located in a tubular member 18 which is shaped as best shown in Figure 3, and which is tightly screwed into an opening in the side of the manometer. One end of this tubular member has an insert 19 placed in it, the insert having a hole therethrough to receive the shaft 8. The hole through the insert is enlarged on its left end as shown at 21 and has a conical projection 22 on its right end for purposes which will be described below. A second bearing for the shaft 8 is provided by means of a disc 23 that is held against an internal shoulder on the member 18 by means of a tube 24 that is in turn held in position by a series of washers 25 which are shaped as shown in Figure 2. The end of the tube is crimped over to hold these washers in place.

It is noted that the shaft 8 has approximately one half of its length cylindrical while the half on the left end is reduced in diameter and is slightly tapered. It has been found that the proper taper is approximately .003 inch reduction in diameter for each inch in the shaft length. The shaft is positioned axially of the tube 18 by means of a thrust bearing 26 that is held in place in a plate 28 by means of a lock nut 27. The plate 28 is suitably spaced from and attached to the tubular member 18 by means of posts 29.

In assembling the bearing the posts 29, the plate 28 and the bearing 26 are assembled on member 18 as best shown in Figure 3 with the bearing adjusted so that some given length of the shaft 8 may project beyond the left end of the tubular member 18. Thereafter the shaft is placed in a tool 31 and the insert is put over the end of the shaft. These parts are placed in the bore of the member 18 and by the use of a drill press or similar machine tool, the tool 31, shaft 8 and insert 19 are forced to the left in Figure 3 until the insert is properly positioned in the member 18. This same operation also serves to force the conical projection 22 of the insert tightly against the surface of the shaft 8 so that an extremely close and accurate fit is obtained. The tool 31 and the shaft 8 are then removed. After this is done a disc 23, which may be slightly smaller in diameter than the enlarged portion of the bore in member 18, is placed over the shaft and they are put into position. The disc 23 is held in position by means of a sleeve 24 which is then inserted into the member 18. Washers 25 are placed beyond the end of the sleeve and a portion of the right end of member 18 is crimped over these washers. The shaft 8 serves to properly center the disc 23 before the crimping takes place so that it is in effect a self-aligning bearing. The shaft is supported by the three bearings with the bearing 19 acting as the pressure seal. After the assembly has been made, the portion of the shaft surrounded by the bearing 19 is subjected to a suitable lapping operation while it is in place so that the shaft and the bearing 19 may be ground to a very fine finish with tolerances that are extremely small.

The portion of the bore of tube 18 between the insert 19 and the disc 23 forms a grease chamber 32 to which access may be obtained through openings in the tube which are closed by threaded plugs 33. When the bearing is being used the chamber 32 is filled with grease or other suitable sealing compound which, preferably, has lubricating properties. In filling the chamber, the openings through the tube 18 are filled and the plugs 33 are then screwed into place thus forcing the grease into the chamber under high pressure and insuring that the bearing portions are properly lubricated.

When the grease chamber 32 is filled, the pressure applied to the grease by the plug 33 will tend to force the grease through the bearings for the shaft 8. If this grease was forced through the opening that receives the shaft in disc 23 there would be a tendency for the space between disc 23 and the washers 25 to fill up with grease and thereby create a grease drag on the shaft 8. This is particularly true, since the pressure of the manometer is applied to the right face of the disc 23 as shown in Figure 1, and this pressure would therefore tend to pack the grease tightly around the shaft near the disc 23 rather than permit the grease to run along the lower portion of the tube 24. In order to prevent such an occurrence from taking place, the disc 23 is formed with a slot 23a that extends radially inward beyond the shoulder which is formed on the interior of the tubular member 18. Communicating with this slot is an inwardly bent portion 24a of the tube 24 which, in cooperation with the member 18, forms a channel extending to the interior of the manometer. When the chamber 32 has been filled with grease, additional pressure by the members 33 will force grease through the opening 23a and along the channel formed by the portion 24a of the sleeve 24 rather than through the bearing formed in the disc 23. Therefore it will be seen that excess pressure on the grease in the interior of the chamber 32 will move the grease toward the manometer through this channel rather than through the bearing in the disc 23 which supports the shaft 8. In this way the space within the tube 24 between disc 23 and the washers 25 is kept free from any grease so that there will never be an excessive grease drag on the shaft. Thus the advantages in a pressure tight bearing which can be obtained with a short grease chamber are not lost because of leakage of the grease beyond the confines of this chamber. It is noted that the pressure within the manometer is always applied to the right end of the bearing in Figure 1 and this pressure would tend to keep the grease in the chamber 32 and in the passage formed by the portion 24a. If, however, grease did come through this passage and fall into the interior of the manometer it would do no harm, since it would merely float on the surface of the mercury along with the float 3.

The space 21 between the outer end of the insert 19 and the shaft 8 is also filled with grease to form a seal which will protect the shaft and the close fitting portion of the bearing. This grease seal is an important part of the present invention since it provides an easily cleaned compartment which will prevent access of corrosive gases, grit, dirt, etc., to the shaft where it enters the close fitting bearing of insert 19, and thereby insures a longer life to the bearing at its most usual point of failure.

Since the pressure of the manometer will always be above that in the instrument casing, the force exerted by this pressure will be toward the left and will tend to force the grease or other sealing compound in chamber 32 through the bearing 19. The conical projection 22 of the insert acts as a deflecting member to turn away any grit, fibrous material or other matter that would tend to collect between the bearing and the shaft. The grease in the chamber may be completely changed by forcing fresh grease in one of the openings and the old grease out of the other. It is noted that the washers 25 are made as best shown in Figure 2 with three arms. This construction leaves openings in the end of the shaft so that the pressure within the manometer may be applied directly to the right face of the disc 23.

One of the causes of a lack of sensitivity in pressure tight bearings is due to a distortion of the shaft when the shaft is subjected to a high static pressure such as occurs in some manometers. This distortion may be overcome by the type of construction shown in Figure 4. As is shown in that figure, a means is provided within the manometer to oppose the force exerted on the right end of the shaft. This means prevents the shaft from having any tendency to move axially in its bearings. In this embodiment of the invention the shaft 34 is shown as being cylindrical and as having a member 35 attached to its right end by a set screw 36, along with the arm 7. The member 35 has an opening in it that is large enough to receive an upstanding portion 37 of a reaction member 38. The member 35 is also provided with a pivot member 39 that is coaxial with the shaft 34 and which is so mounted that it bears against the right face of portion 37. Thus the force applied to the shaft by the manometer pressure is counteracted within the manometer chamber and there is no tendency for the shaft to be distorted and bind in its bearings. It is noted that the reaction member 38 may either be made as an extension of the tubular member 18, as shown, or may be made as a separate part. In this case the thrust bearing 42 which corresponds to the bearing 26 in Figure 1 serves mainly to locate the shaft 34 during assembly of the bearing and as a safety device in case something should happen to member 35.

Figure 4:
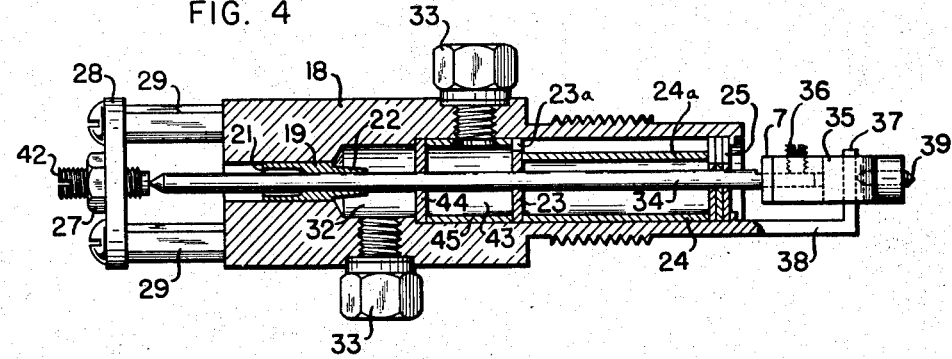
Figure 4 is a view of another type of bearing.

In the construction shown in Figure 4 the insert 19 does not extend to the end of the tubular member 18 as it did in Figure 1. This construction provides an even larger seal than that previously described.

In pressure tight bearings greases must be selected which are not solvent in or affected otherwise by the fluid which is being measured. Some of these greases although satisfying the above condition do not function as effective grease seals when used in a bearing of this type. In a case of this sort it is advisable to form two grease chambers, and such a construction is shown in Figure 4. A grease chamber 43 is filled with a grease which is not solvent in the material being measured, and the second grease chamber 32 is filled with a grease that will form a good pressure tight seal. These two chambers are separated from each other by a disc 44 that is held in place against a shoulder formed internally of the member 18 and a sleeve 45 that extends between the disc 44 and the previously described disc 23. Each of the chambers may be provided with one or two openings through which grease is inserted and which may be closed by a plug 33. It is noted that the disc 23 is provided with a slot 23a and the tube 24 is provided with the portion 24a to form a channel similar to that formed by these parts in Figure 1.

Figure 5:
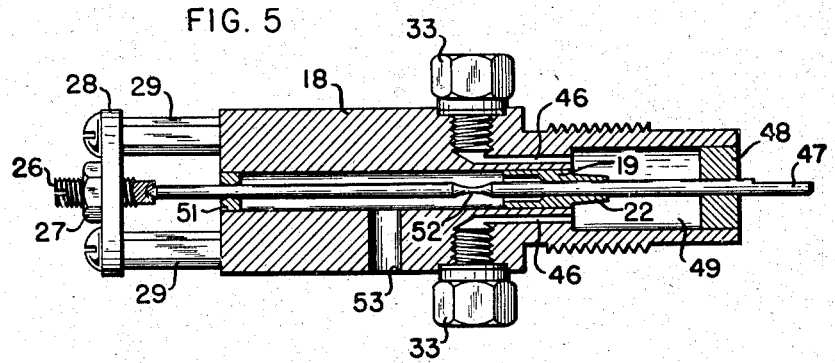
Figure 5 is a view of still another type of bearing.

In Figure 5 there is shown another construction in which lack of sensitivity of the pressure tight bearing is overcome by means of a special construction of a rotating shaft. In this case the grease chamber 49 is located in the right end of the bearing adjacent the manometer and is formed between the bearing insert 19 and a plug 48 that is pressed into the open end of the tubular member 18. The grease is supplied to this chamber from openings which are closed by plugs 33 and passages 46 that connect these openings with the chamber 49. The shaft 47 is supported rigidly in a bearing formed in the plug 48 and in the pressure tight bearing formed in the insert 19. The distance between the insert 19 and the rear bearing 48 is short so that the tendency for the shaft to bow between these two points is minimized. A third bearing 51 is also provided at the left end of member 18. To the left of bearing 19 the shaft is formed with a radially reduced portion 52. Therefore upon the occurrence of an end thrust on the shaft, it can bow a reasonable amount between the thrust bearing 26 and the portion 52 without binding in the bearing 51 or placing an abnormal side thrust on the bearing 19. This is accomplished by the universal joint effect which is obtained between the shaft 47 and the bearing 51 which has an internal spherical form. Also, the shaft is free to assume distorted positions imposed on it by deformed pivots and thrust plates without excessive binding, due to freedom of motion provided by the special spherical form of bearing 51.

The tubular member 18 is provided with an opening 53 through which grease may escape if there is a failure of the pressure tight seal. The use of this opening prevents the grease from going into the instrument casing and permits it to be discharged in the space between the casing and the manometer where it can do no harm.

Figure 6:
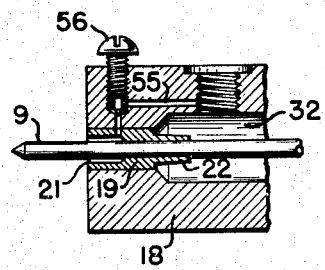
Figures 6 and 7 show views of different types of grease seals that may be used with the bearing.

As has previously been mentioned, the cut-out portion 21 of the insert 19 forms a grease seal which will serve to protect the pressure tight portion of the bearing from corrosive gases and small particles of dirt or grit. At times it may become desirable to remove the grease in this seal and replenish it with new grease. To this end the construction shown in Figure 6 may be used to advantage. In that figure the seal 21 is shown as being connected by means of a passage 55 with the opening through which grease is supplied to the grease chamber 32 of the bearing. The passage 55 may be closed by a suitable adjusting screw 56 so that grease is not necessarily forced into this passage when it is supplied to the grease chamber 32.

Figure 7:
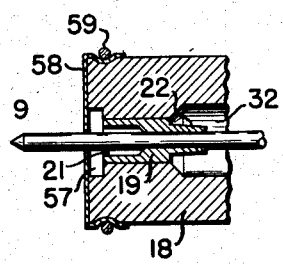

Another type of grease seal is shown in Figure 7. In this figure the seal 21 communicates with a recessed portion 57 formed in member 18 beyond the end of insert 19. Placed over the shaft and covering the outer end of the tubular member 18 is a diaphragm 58 which is held in place by means of a snap ring 59. This diaphragm serves to retain the grease in the portion 57 of the grease seal and at the same time a larger supply of grease is supplied through which any contaminating particles must pass.

From the above description it will be seen that I have invented a pressure tight bearing that is extremely sensitive to forces applied to the shaft, and one which is easily assembled. The feature of the short grease sealing chamber is of importance in the sensitivity of the bearing since it reduces the grease drag on the shaft. Also of importance is the grease seal on the exterior of the bearing that acts to prevent contaminating material from getting into contact with the shaft at the point where the extremely close fitting pressure tight bearing begins. The use of the conical point on the bearing insert, which point extends inwardly toward the grease chamber also helps to keep the bearing itself free from grit, etc., which might tend to score the shaft and cause binding or loss of sensitivity. It is noted that the insert may be made of hard or soft metal depending upon the tolerances that must be maintained and the use to which the bearing will be put.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent, is:

1. A pressure tight bearing for a shaft having a tapered portion comprising a tubular support, a pair of bearing members located in said support, one of said members being elongated and being formed with a tapered opening to receive the tapered portion of said shaft, a part attached to said support on an end thereof, and an adjustable thrust bearing mounted in said part in a position to be engaged by an end of said shaft, said thrust bearing being adjustable to vary the axial position of said shaft and its clearance with said elongated bearing member.

2. A pressure tight bearing for a shaft comprising a tubular support, a plurality of bearing parts located in said support, one of said parts being relatively short and serving to support a portion of said shaft, another of said parts being relatively long and serving to support another portion of said shaft, said last mentioned part being formed with a conical extension concentric with the shaft and extending toward said first mentioned part, the opening of said last mentioned part being provided with an enlarged portion extending to the end thereof remote from said conical projection whereby said last mentioned part surrounds said shaft without engaging it for a portion of the length of said part, and closely surrounds said shaft for the remainder of the length of said part.

3. A pressure tight bearing for a shaft which is subjected to a higher pressure on one end than on the other end, a tubular support, a plurality of bearing members in said support, one of said members being subjected to a higher pressure than the other, the space between said members forming a chamber to receive a sealing compound to prevent loss of pressure across said support, the bearing member subjected to the lower pressure being formed with a conical projection extending into said chamber concentric with said shaft and being formed with a cavity concentric with said shaft and at a point remote from said conical projection, said cavity communicating with the lower pressure to which said shaft is subjected.

4. In a pressure tight shaft for a bearing, the combination comprising a tubular supporting member, a plurality of bearing parts located in said member each part being provided with an opening through which said shaft extends, the space between two of said parts forming a chamber adapted to receive a sealing compound, one of said bearing parts being formed with a conical projection concentric with the shaft and extending into said chamber, said bearing part also being formed with the opening therein enlarged at a point remote from said chamber, said enlarged portion serving to form a seal when filled with sealing compound, a passageway in said member between said seal and said chamber, and means to close off said passageway.

5. A pressure tight bearing for a shaft, said bearing comprising a tubular supporting member, an insert forming a bearing part placed in the interior of said tubular member, said insert being formed with a central opening through which said shaft extends, the said opening having a portion thereof adjacent the end of the insert larger than said shaft whereby a sealing compound may be placed therein to form a seal to protect the remainder of the central opening of said insert and the portion of said shaft received thereby, a second insert also placed in said tubular member to form a second bearing part for said shaft, the space between said inserts forming a chamber, said first insert being provided with a conical projection surrounding said shaft and extending into said chamber, said tubular member being provided with an opening giving access to said chamber, and means to force a sealing compound into said chamber.

6. A pressure tight bearing for a shaft comprising a tubular member through which said shaft extends, a first bearing located in said tubular member to support a portion of said shaft, a second bearing located in said tubular member to support a portion of said shaft, said second bearing comprising a portion closely engaging said shaft and being formed on an end thereof away from said first bearing with an opening concentric with said shaft and larger in diameter than the shaft, said second bearing also being formed with a conical projection extending toward said first bearing, the space between said two bearings forming a chamber adapted to receive a sealing material, and an opening in said tubular member leading to said chamber through which said sealing material may be inserted.

7. A pressure tight bearing for a rotatable shaft, said bearing comprising a tubular supporting member, a plurality of bearing parts for said shaft located in said tubular member, said parts forming between them a plurality of chambers, the bearing part forming the end of one of said chambers being formed with a projecting portion conical in shape and extending into said chamber, means through which a sealing compound may be forced into said last mentioned chamber said projecting portion serving to deflect any foreign matter carried by the sealing compound from the cooperating portions of said bearing and shaft.

8. A pressure tight bearing for a shaft having a tapered portion, said bearing comprising a tubular member, an insert in said tubular member with an opening to receive the tapered portion of said shaft, a bearing part received by said member to also support a portion of said shaft, means supported by said member and projecting beyond the end thereof, and a thrust bearing adjustably mounted in said last mentioned means against which the end of said shaft bears, adjustment of the thrust bearing serving to adjust said shaft axially to thereby vary the clearance between said shaft and said insert.

9. A pressure tight bearing for a shaft having a tapered portion, said bearing including a tubular member, a plurality of shaft supporting parts located in said member, means to hold said parts in spaced position in said member, each of said parts having an opening through which said shaft may project, the opening in one of said parts being elongated and tapered to receive the tapered portion of said shaft, means to adjust said shaft axially to thereby vary the clearance between said shaft and said part, the space between said last mentioned part and the part adjacent thereto forming a chamber to receive a sealing compound, said member being formed with an opening through which a sealing compound may be placed in said chamber, and means to force the sealing compound into said chamber.

10. A pressure tight bearing for a shaft, said bearing including a tubular supporting member, a plurality of bearing parts located in said member and each having an opening therein through which said shaft extends, the spaces between said parts forming separate chambers in which suitable sealing compounds may be inserted, said member being formed with an opening leading to each of said chambers, one of said parts being formed with a conical extension projecting from one end into one of said chambers, said extension being coaxial with said shaft, said part also being formed with an enlarged portion in the opening thereof and communicating with the end of said part opposite said extension, said opening being adapted to receive the sealing compound from the chamber into which said projection extends as the sealing compound flows between said bearing part and shaft.

11. A pressure tight bearing for a shaft having a force applied to one end, said bearing including a tubular support, a plurality of bearing parts in said support, each of said parts having an opening through which said shaft extends, an arm projecting from said support and having a portion in axial alignment with said shaft, a member attached to said shaft and having a part thereof lying adjacent said portion, a stop on said member coaxial with said shaft and engaging said portion to limit the axial movement of said shaft and member with respect to said bearing parts as the force is applied to said shaft.

12. In a pressure tight bearing for a shaft having a radially reduced portion and upon which an end thrust is placed, a tubular supporting member, a pair of bearing parts located in said member and having axial bores to receive said shaft and support the same for rotation, a third bearing part having a spherical bearing surface also located in said member and adjacent an end thereof, the radially reduced portion of said shaft being located between said last mentioned bearing part and one of said first mentioned bearing parts, and means to axially locate said shaft with respect to said supporting member.

13. A pressure tight bearing for a shaft comprising a tubular support, a plurality of bearing parts located in said support with two of said parts being adjacent the ends thereof and one of said parts being intermediate the other two, said shaft being journaled for rotation in said parts, the space between one of said end parts and said intermediate part forming a chamber for a sealing compound, means to insert the sealing compound in said chamber under pressure, and means to form a channel out of contact with said shaft between said intermediate part and the other of said end parts through which excess sealing compounds may be conducted to be discharged at the exterior of said tubular support.

14. A pressure tight bearing for a shaft, said bearing comprising a tubular supporting member, an insert forming a bearing part placed in the interior of said tubular member, said insert being formed with a central opening through which said shaft extends, said opening having a portion thereof adjacent the end of the insert larger than said shaft whereby a sealing compound may be placed therein to form a seal to protect the remainder of the central opening of said insert and the portion of the shaft received thereby, a second insert also placed in said tubular member to form a second bearing part for said shaft, the space between said inserts forming a chamber, said tubular member being provided with an opening giving access to said chamber, and means to force a sealing compound into said chamber.

FREDERICK W. SIDE.